United States Patent
Jacobs et al.

(10) Patent No.: US 7,571,215 B2
(45) Date of Patent: Aug. 4, 2009

(54) DATA REPLICATION PROTOCOL

(75) Inventors: Dean Bernard Jacobs, Berkeley, CA (US); Reto Kramer, San Francisco, CA (US); Ananthan Bala Srinivasan, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 638 days.

(21) Appl. No.: 09/975,590

(22) Filed: Oct. 11, 2001

(65) Prior Publication Data

US 2003/0018732 A1    Jan. 23, 2003

Related U.S. Application Data

(60) Provisional application No. 60/305,986, filed on Jul. 16, 2001.

(51) Int. Cl.
*G06F 15/16* (2006.01)

(52) U.S. Cl. .................. 709/208; 709/203; 709/209; 709/216; 709/217

(58) Field of Classification Search ............... 709/200, 709/203, 219, 206, 216, 217, 201, 208, 232; 707/201–203
See application file for complete search history.

(56) References Cited

U.S. PATENT DOCUMENTS

| | | | |
|---|---|---|---|
| 4,714,996 A | 12/1987 | Gladney et al. | |
| 5,163,148 A | 11/1992 | Walls | |
| 5,201,010 A | 4/1993 | Deaton et al. | |
| 5,212,793 A | 5/1993 | Donica et al. | |
| 5,249,290 A | 9/1993 | Heizer | |
| 5,434,994 A * | 7/1995 | Shaheen et al. | 709/203 |
| 5,613,060 A | 3/1997 | Britton et al. | |
| 5,634,052 A * | 5/1997 | Morris | 709/219 |
| 5,761,507 A | 6/1998 | Govett | |
| 5,765,171 A * | 6/1998 | Gehani et al. | 707/203 |
| 5,768,504 A | 6/1998 | Kells et al. | |
| 5,774,689 A | 6/1998 | Curtis et al. | |
| 5,796,934 A | 8/1998 | Bhanot et al. | 395/182.02 |
| 5,802,291 A | 9/1998 | Balick et al. | |
| 5,805,798 A | 9/1998 | Kearns et al. | |
| 5,813,017 A * | 9/1998 | Morris | 707/203 |
| 5,819,107 A | 10/1998 | Lichtman et al. | |
| 5,832,514 A * | 11/1998 | Norin et al. | 709/209 |
| 5,909,689 A * | 6/1999 | Van Ryzin | 707/203 |

(Continued)

OTHER PUBLICATIONS

U.S. Appl. No. 09/975,587, filed Oct. 11, 2001, Dean Bernard Jacobs, et al.

(Continued)

*Primary Examiner*—Ramy Mohamed Osman
(74) *Attorney, Agent, or Firm*—Fliesler Meyer LLP

(57) ABSTRACT

Data can be replicated over a network using a one or two phase method. For the one phase method, a master server containing an original copy of the data sends a version number for the current state of the data to each slave on the network so that each slave can request a delta from the master. The delta that is requested contains the data necessary to update the slave to the appropriate version of the data. For the two phase method, the master server sends a packet of information to each slave. The packet of information can be committed by the slaves if each slave is able to process the commit.

6 Claims, 7 Drawing Sheets

U.S. PATENT DOCUMENTS

| | | | |
|---|---|---|---|
| 5,910,180 A | 6/1999 | Flory et al. | |
| 5,920,867 A | 7/1999 | Van Huben | 707/101 |
| 5,926,775 A | 7/1999 | Brumley et al. | |
| 5,987,575 A * | 11/1999 | Yamaguchi | 707/203 |
| 5,999,947 A * | 12/1999 | Zollinger et al. | 707/203 |
| 6,018,627 A | 1/2000 | Iyengar et al. | |
| 6,018,805 A | 1/2000 | Ma et al. | |
| 6,044,367 A | 3/2000 | Wolff | 707/2 |
| 6,055,243 A | 4/2000 | Vincent et al. | |
| 6,065,046 A * | 5/2000 | Feinberg et al. | 709/216 |
| 6,088,694 A | 7/2000 | Burns et al. | 707/8 |
| 6,098,078 A * | 8/2000 | Gehani et al. | 707/203 |
| 6,112,304 A | 8/2000 | Clawson | 713/156 |
| 6,122,629 A | 9/2000 | Walker et al. | |
| 6,134,673 A | 10/2000 | Chrabaszcz | 714/13 |
| 6,145,012 A * | 11/2000 | Small | 709/219 |
| 6,173,293 B1 | 1/2001 | Thekkath et al. | |
| 6,173,327 B1 | 1/2001 | De Borst et al. | |
| 6,189,046 B1 | 2/2001 | Moore et al. | |
| 6,212,521 B1 | 4/2001 | Minami et al. | |
| 6,212,556 B1 | 4/2001 | Arunachalam | |
| 6,233,589 B1 * | 5/2001 | Balcha et al. | 707/203 |
| 6,243,753 B1 | 6/2001 | Machin et al. | |
| 6,256,634 B1 * | 7/2001 | Moshaiov et al. | 709/208 |
| 6,263,372 B1 | 7/2001 | Hogan et al. | 709/237 |
| 6,269,373 B1 | 7/2001 | Apte et al. | |
| 6,304,879 B1 | 10/2001 | Sobeski et al. | |
| 6,304,882 B1 | 10/2001 | Strellis et al. | 707/202 |
| 6,338,089 B1 | 1/2002 | Quinlan | |
| 6,343,287 B1 | 1/2002 | Kumar et al. | |
| 6,345,288 B1 * | 2/2002 | Reed et al. | 709/203 |
| 6,351,775 B1 | 2/2002 | Yu | 709/238 |
| 6,366,930 B1 * | 4/2002 | Parker et al. | 707/203 |
| 6,366,986 B1 * | 4/2002 | St. Pierre et al. | 711/162 |
| 6,374,262 B1 * | 4/2002 | Kodama | 707/201 |
| 6,389,462 B1 | 5/2002 | Cohen et al. | |
| 6,401,239 B1 * | 6/2002 | Miron | 707/203 |
| 6,405,219 B2 * | 6/2002 | Saether et al. | 709/219 |
| 6,411,956 B1 | 6/2002 | Ng | |
| 6,425,005 B1 | 7/2002 | Dugan et al. | |
| 6,430,564 B1 | 8/2002 | Judge et al. | |
| 6,438,705 B1 | 8/2002 | Chao et al. | |
| 6,453,321 B1 | 9/2002 | Hill et al. | |
| 6,453,356 B1 | 9/2002 | Sheard et al. | |
| 6,466,972 B1 | 10/2002 | Paul et al. | |
| 6,477,150 B1 | 11/2002 | Maggenti et al. | 370/312 |
| 6,484,143 B1 | 11/2002 | Swildens et al. | 705/1 |
| 6,505,200 B1 | 1/2003 | Ims et al. | 707/8 |
| 6,505,241 B2 | 1/2003 | Pitts | |
| 6,523,130 B1 | 2/2003 | Hickman et al. | |
| 6,526,521 B1 | 2/2003 | Lim | 714/4 |
| 6,539,381 B1 | 3/2003 | Prasad et al. | 707/10 |
| 6,542,845 B1 | 4/2003 | Grucci et al. | |
| 6,578,160 B1 | 6/2003 | MacHardy, Jr. et al. | 714/43 |
| 6,609,213 B1 | 8/2003 | Nguyen et al. | |
| 6,647,399 B2 * | 11/2003 | Zaremba | 707/203 |
| 6,651,140 B1 | 11/2003 | Kumar | |
| 6,687,848 B1 | 2/2004 | Najmi | |
| 6,721,777 B1 | 4/2004 | Sharma et al. | |
| 6,754,678 B2 * | 6/2004 | Norris et al. | 707/201 |
| 6,757,708 B1 | 6/2004 | Craig et al. | 709/203 |
| 6,775,703 B1 | 8/2004 | Burns et al. | |
| 6,779,017 B1 | 8/2004 | Lamberton et al. | |
| 6,826,601 B2 * | 11/2004 | Jacobs et al. | 709/217 |
| 6,832,238 B1 | 12/2004 | Sharma et al. | |
| 6,836,889 B1 | 12/2004 | Chan et al. | |
| 6,877,111 B2 | 4/2005 | Sharma et al. | 714/13 |
| 6,898,587 B2 | 5/2005 | Messinger | |
| 6,918,013 B2 * | 7/2005 | Jacobs et al. | 707/201 |
| 6,944,785 B2 | 9/2005 | Gadir et al. | |
| 6,963,857 B1 | 11/2005 | Johnson | |
| 7,000,019 B2 | 2/2006 | Low et al. | |
| 7,028,030 B2 * | 4/2006 | Jacobs et al. | 707/10 |
| 7,065,616 B2 | 6/2006 | Gajjar et al. | |
| 7,085,834 B2 | 8/2006 | Delany et al. | |
| 7,089,584 B1 | 8/2006 | Sharma | |
| 7,100,195 B1 | 8/2006 | Underwood | |
| 7,107,543 B2 | 9/2006 | Berry et al. | |
| 7,127,713 B2 | 10/2006 | Davis et al. | |
| 7,171,692 B1 | 1/2007 | DeMello et al. | |
| 7,240,101 B2 | 7/2007 | Rich et al. | |
| 7,254,634 B1 | 8/2007 | Davis et al. | |
| 2001/0042073 A1 | 11/2001 | Saether et al. | |
| 2001/0054062 A1 | 12/2001 | Ismael et al. | |
| 2002/0004850 A1 | 1/2002 | Sudarshan et al. | |
| 2002/0073188 A1 | 6/2002 | Rawson, III | |
| 2002/0073354 A1 | 6/2002 | Schoroiff et al. | |
| 2002/0107934 A1 | 8/2002 | Lowery et al. | |
| 2002/0147961 A1 | 10/2002 | Charters et al. | |
| 2002/0161839 A1 | 10/2002 | Colasurdo et al. | |
| 2002/0184444 A1 | 12/2002 | Shandony | |
| 2002/0188591 A1 | 12/2002 | Santosuosso | |
| 2002/0188613 A1 | 12/2002 | Chakraborty et al. | |
| 2003/0014480 A1 | 1/2003 | Pullara et al. | |
| 2003/0018732 A1 | 1/2003 | Jacobs et al. | |
| 2003/0041135 A1 | 2/2003 | Keyes et al. | |
| 2003/0060214 A1 | 3/2003 | Hendrey et al. | |
| 2003/0065686 A1 | 4/2003 | Callahan et al. | |
| 2003/0065826 A1 | 4/2003 | Skufca et al. | |
| 2003/0074580 A1 | 4/2003 | Knouse et al. | |
| 2003/0088713 A1 | 5/2003 | Mandal et al. | |
| 2003/0105837 A1 | 6/2003 | Kamen et al. | |
| 2003/0110467 A1 | 6/2003 | Balakrishnan | |
| 2003/0115366 A1 | 6/2003 | Robinson | |
| 2003/0233433 A1 | 12/2003 | Halpern | |
| 2003/0236923 A1 | 12/2003 | Jeyaraman et al. | |
| 2004/0059735 A1 | 3/2004 | Gold et al. | |
| 2004/0139125 A1 | 7/2004 | Strassburg et al. | |
| 2004/0153558 A1 | 8/2004 | Gunduce et al. | |
| 2004/0230747 A1 | 11/2004 | Ims et al. | |
| 2006/0143239 A1 | 6/2006 | Battat et al. | |
| 2006/0168118 A1 | 7/2006 | Godlin et al. | |
| 2006/0212453 A1 | 9/2006 | Eshel et al. | |

OTHER PUBLICATIONS

U.S. Appl. No. 09/405,260, filed Sep. 23, 1999, Dean Bernard Jacobs, et al.

U.S. Appl. No. 09/405,508, filed Sep. 23, 1999, Dean Bernard Jacobs, et al.

U.S. Appl. No. 09/405,500, filed Sep. 23, 1999, filed Dean Bernard Jacobs, et al.

U.S. Appl. No. 60/305,985, filed Jul. 16, 2001, filed Chang, et al.

*Achieving Scalability and High Availability for E-Commerce and Other Web Applications*, BEA Systems, Inc., Jun. 15, 1999.

BEA WebLogic Server Version 6.0 DataSheet, BEA Systems, Inc., Dec. 17, 2000.

BEA WebLogic Server Version 6.1 DataSheet, BEA Systems, Inc., May 30, 2001.

Bainbridge, "CICS and Enterprise JavaBeans", v. 40, No. 1, pp. 1-19.

Newport, Billy, "JMX" http://www.theserverside.com/articles/articles.tss?1=JMX.

Kooijmans, Enterprise JavaBeans for z/OS and OS/390 WebSphere Application Server V4.0; 2001, pp. 31-78, 185-240.

Abdallah, et al., "One-Phase Commit: Does It Make Sense?", Proceedings of International Conference on Parallel and Distributed Systems, Dec. 14-16, 1998, pp. 182-192.

BEA Systems, Inc., WebLogic Server 6.1, Sep. 15, 2001, 26 pages.

Visveswaran, "Dive Into Connection Pooling with J2EE", Sun MicroSystems Inc., Oct. 2000, pp. 1-7.

Stearns, "Using the J2EE Connector Architecture Common Client Interface", Sun MicroSystems Inc., Apr. 2001, pp. 1-10.

Marinescu, "BEA Weblogic Server 6.1 has been released", TheServerSide.com, Jul. 31, 2001, p. 1.

Rana, et al., "Java Junction", Intelligent Enterprise, Apr. 16, 2001, pp. 1-9.

Flowers, "The J2EE Connector Architecture", Sys-Con Media, May 1, 2001, pp. 1-4.

Stanhope, "J2EE Connector Architecture Promises to Simplify Connection to Back-End Systems", Giga Information Group, Nov. 16, 2000, pp. 1-4.

Sarathy, et al., "Integrating Java Applications with the Enterprise", EAI Journal, May 2001, pp. 50-54.

BEA Systems, Inc., WebLogic Server 6.1, Sep. 19, 2001, 36 pages.

Rodoni, "The J2EE Connector Architecture's Resources Adapter", Sun MicroSystems Inc., Dec. 2001, pp. 1-12.

BEA Systems, "Connection Management", WebLogic Server 6.1, 2001, 3 pages.

Gamma, et al., "Design Patterns Elements of Reusable Object-Oriented Software", Addison-Wesley Publishing Company, 1995, 13 pages.

Sun Microsystems, "Enterprise JavaBeans Specification, Version 2.0", 2 pages, Aug. 14, 2001.

* cited by examiner

DATA REPLICATION PROTOCOL

CLAIM OF PRIORITY

This application claims priority to U.S. Provisional patent application No. 60/305,986, filed Jul. 16, 2001, entitled DATA REPLICATION PROTOCOL, incorporated herein by reference.

CROSS-REFERENCE TO RELATED APPLICATION

The following application is cross-referenced and incorporated herein by reference:

U.S. patent application Ser. No. 90/975,587 entitled "LAYERED ARCHITECTURE FOR DATA REPLICATION", inventors Dean Bernard Jacobs, Reto Kramer, and Ananthan Bala Srinivasan, filed on Oct. 11, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The invention relates generally to a system for transferring data. The invention relates more specifically to a system and method for replicating data over a network.

BACKGROUND

There are several types of distributed processing systems. Generally, a distributed processing system includes a plurality of processing devices, such as two computers coupled through a communication medium. One type of distributed processing system is a client/server network. A client/server network includes at least two processing devices, typically a central server and a client. Additional clients may be coupled to the central server, there may be multiple servers, or the network may include only servers coupled through the communication medium.

In such a network environment, it is often desirable to send applications or information from the central server to a number of workstations and/or other servers. Often, this may involve separate installations on each workstation, or may involve separately pushing a new library of information from the central server to each individual workstation and/or server. These approaches can be time consuming and are an inefficient use of resources. The separate installation of applications on each workstation or server also introduces additional potential sources of error.

Ideally, the sending of information should be both reliable in the face of failures and scalable, so that the process makes efficient use of the network. Conventional solutions generally fail to achieve one or both of these goals. One simple approach is to have a master server individually contact each slave and transfer the data over a point-to-point link, such as a TCP/IP connection. This approach leads to inconsistent copies of the data if one or more slaves are temporarily unreachable, or if the slaves encounter an error in processing the update. At the other extreme are complex distributed agreement protocols, which require considerable cross-talk among the slaves to ensure that all copies of the data are consistent.

BRIEF SUMMARY

The present invention includes a method for replicating data from a master server to at least one slave or managed server, such as may be accomplished on a network. In the method, it may be determined whether the replication should be accomplished in a one or two phase method. If the replication is to be accomplished in a one phase method, a version number may be sent that corresponds to the current state of the data on the master server. This version number may be sent to every slave server on the network, or only a subset of slave servers. The slave servers receiving the version number may then request that a delta be sent from the master. The delta may contain data necessary to update the data on that slave to correspond to the current version number.

If the replication is to be accomplished in a two phase method, a packet of information may be sent from the master to each slave, or a subset of slaves. Those slaves may then respond to the master server whether they can commit the packet of information. If at least some of the slaves can commit the data, the master may signal to those slave that they should process the commit. After processing the commit, those slaves may update to the current version number. If any of the slaves are unable to process the commit, the commit may be aborted.

DETAILED DESCRIPTION

The present invention provides for the replication of data or other information, such as from a master server, or "administration" server ("Admin server"), to a collection of slave servers, or "managed" servers. This replication can occur over any appropriate network, such as a conventional local area network or ethernet. In one embodiment, a master server owns the original record of all data on the network, to which any updates are to be applied. A copy of the data, together with updates as they occur, can be transmitted to each slave server. One example application involves the distribution of configuration information from an Admin server to a collection of managed servers.

In one system in accordance with the present invention, it may be necessary for a service, such as a Data Replication Service (DRS), to distribute configuration and deployment information from an Admin Server to managed servers in the appropriate domain. Large data items can be distributed over point-to-point connections, such as Transmission Control Protocol ("TCP"), since a multicast protocol like User Datagram Protocol ("UDP") does not have flow control, and can overwhelm the system. Remote Method Invocation (RMI), Hypertext Transfer Protocol (HTTP), or a similar protocol may be used for point-to-point connections.

Managed servers can also persistently cache data on local disks. Without such caching, an unacceptable amount of time may be required to transfer the necessary data. The ability of the managed servers to cache is important, as it increases the speed of startup by reducing the amount of startup data to be transferred. Caching can also allow startup and/or restart if the Admin Server is unreachable. Restart may be a more attractive option, and it may be the case that the Admin server directs a server to start. Caching, however, can provide the ability to start the domain without the Admin Server being available.

Figure 1:
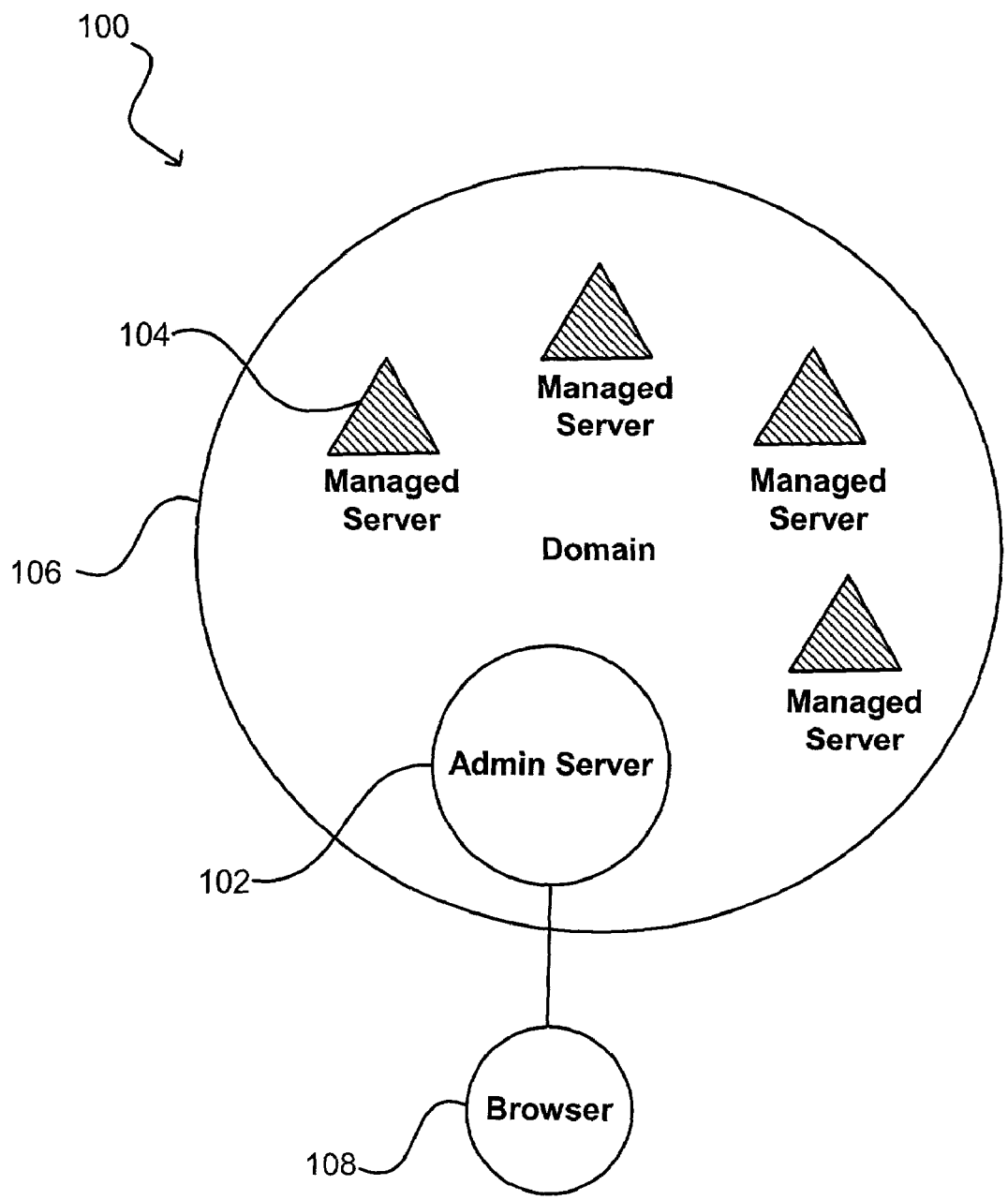
FIG. 1 is a diagram of a domain structure in accordance with one embodiment of the present invention.

As shown in the domain structure 100 of FIG. 1, an Admin Server 102 and at least one managed server 104 can comprise a domain 106. This domain 106 can be the administration unit for startup and shutdown. In one embodiment, a browser 108, or other user application or device, tells the Admin Server 102 to start. The Admin Server 102 then tells all managed servers 104 in the domain 106 to start, and passes the appropriate configuration information. If a server goes down after the managed servers 104 have started, it may be desirable for that server to restart automatically, whether or not the Admin Server 102 is available. Cached data can be useful for this purpose.

Updates to data on the Admin Server can be packaged as incremental deltas between versions. The deltas can contain configuration and/or other information to be changed. It may be preferable to update the configuration while the domain is running, as it may be undesirable to take the system offline. In one embodiment, the configuration changes happen dynamically, as they are pushed out by the Admin Server. Only the changes to the configuration are sent in the deltas, as it may be unnecessary, and unduly cumbersome, to send the full configuration each time.

A protocol in accordance with the present invention integrates two methods for the distribution of updates, although other appropriate methods may be used accordingly. These distribution methods may be referred to as a one-phase method and a two-phase method, and can provide a tradeoff between consistency and scalability. In a one-phase method, which may favor scalability, each slave can obtain and process updates at its own pace. Slaves can get updates from the master at different times, but can commit to the data as soon as it is received. A slave can encounter an error in processing an update, but in the one-phase method this does not prevent other slaves from processing the update.

In a two-phase method in accordance with the present invention, which may favor consistency, the distribution can be "atomic", in that either all or none of the slaves successfully process the data. There can be separate phases, such as prepare and commit phases, which can allow for a possibility of abort. In the prepare phase, the master can determine whether each slave can take the update. If all slaves indicate that they can accept the update, the new data can be sent to the slaves to be committed in the commit phase. If at least one of the slave servers cannot take the update, the update can be aborted and there may not be a commit. In this case, the managed servers can be informed that they should roll back the prepare and nothing is changed. Such a protocol in accordance with the present invention is reliable, as a slave that is unreachable when an update is committed, in either method, eventually gets the update.

A system in accordance with the present invention can also ensure that a temporarily unavailable server eventually receives all updates. For example, a server may be temporarily isolated from the network, then come back into the network without restarting. Since the server is not restarting, it normally will not check for updates. The server coming back into the network can be accounted for by having the server check periodically for new updates, or by having a master server check periodically to see whether the servers have received the updates.

In one embodiment, a masterserver regularly sends multicast "heartbeats" to the slave servers. Since a multicast approach can be unreliable, it is possible for a slave to miss arbitrary sequences of heartbeats. For instance, a slave server might be temporarily disconnected from the network due to a network partitioning, or the slave server itself might be temporarily unavailable to the network due, causing a heartbeat to be missed. Heartbeats can therefore contain a window of information about recent updates. Such information about previous updates may be used to reduce the amount of network traffic, as explained below.

There can be at least two layers within each master and each slave: a user layer and a system layer (or DRS layer). The user layer can correspond to the user of the data replication system. A DRS layer can correspond to the implementation of the data replication system itself. The interaction of these participants and layers is shown in FIG. 2.

Figure 2:
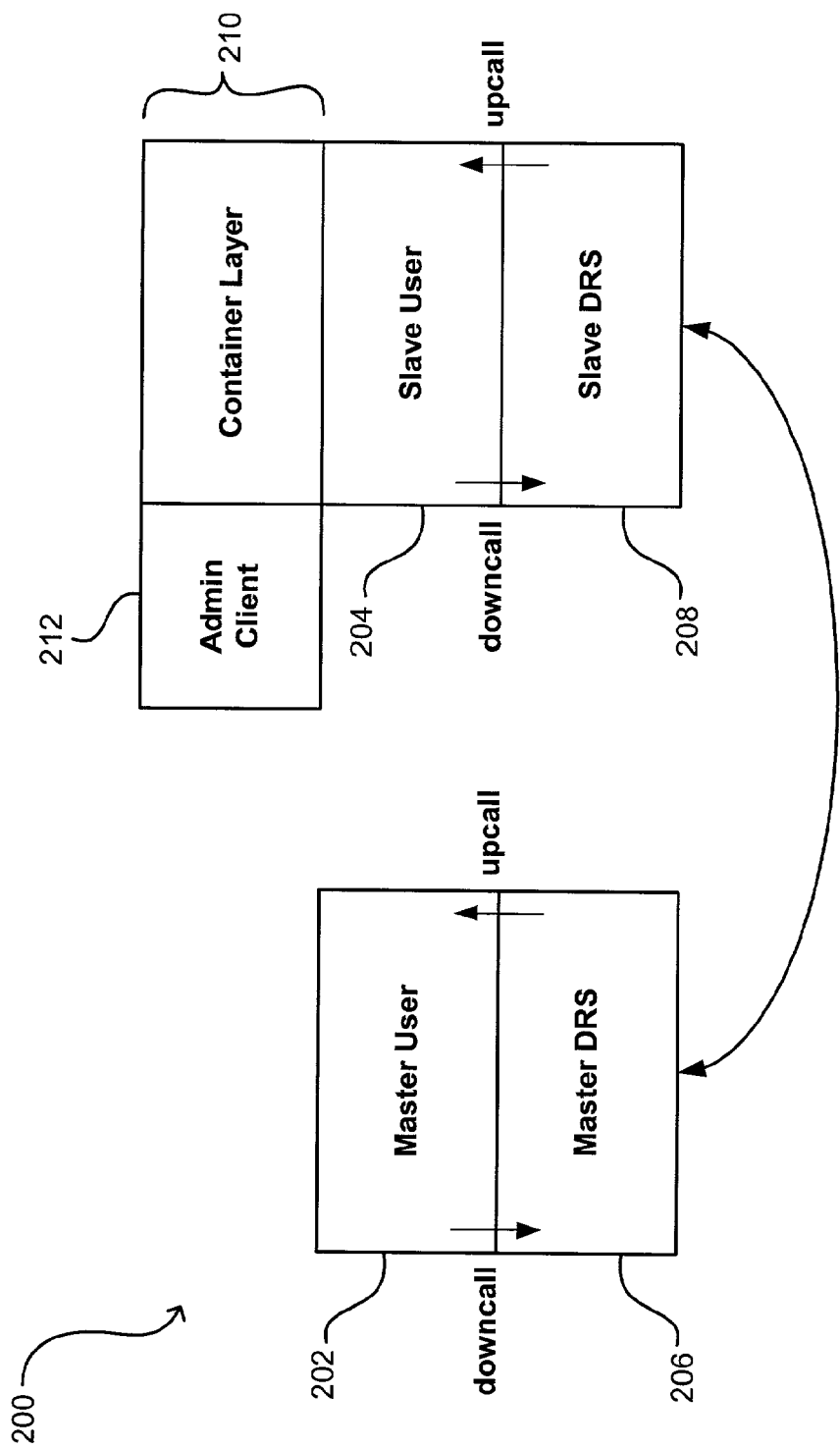
FIG. 2 is a diagram of layered architecture in accordance with one embodiment of the present invention.

As shown in the startup diagram 200 of FIG. 2, the master user 202 and slave user 204 layers in this embodiment make downcalls into the master DRS 206 and slave DRS 208 layers, respectively. Such downcalls can, for example, take the form of:

registerMaster(DID, verNum, listener)
registerSlave(DID, verNum, listener)

where DID is an identifier taken from knowledge of well-known DIDs and refers to the object of interest, verNum is taken from the local persistent store as the user's current version number, and listener is an object that will handle upcalls from the DRS layer. The upcall can call a method on the listener object. The master can then begin to send heartbeats, or periodic deltas, with the current version number. A container layer 210 is shown, which can include containers adapted to take information from the slave user 204. Examples of possible containers include enterprise Java beans, web interfaces, and J2EE (Java 2 Platform, Enterprise Edition) applications. Other applications and/or components can plug into the container layer 210, such as an administration client 212. Examples of update messaging between the User and DRS layers are shown for the one phase method in FIG. 4, as well as for the two phase method in FIG. 5.

Figure 4:
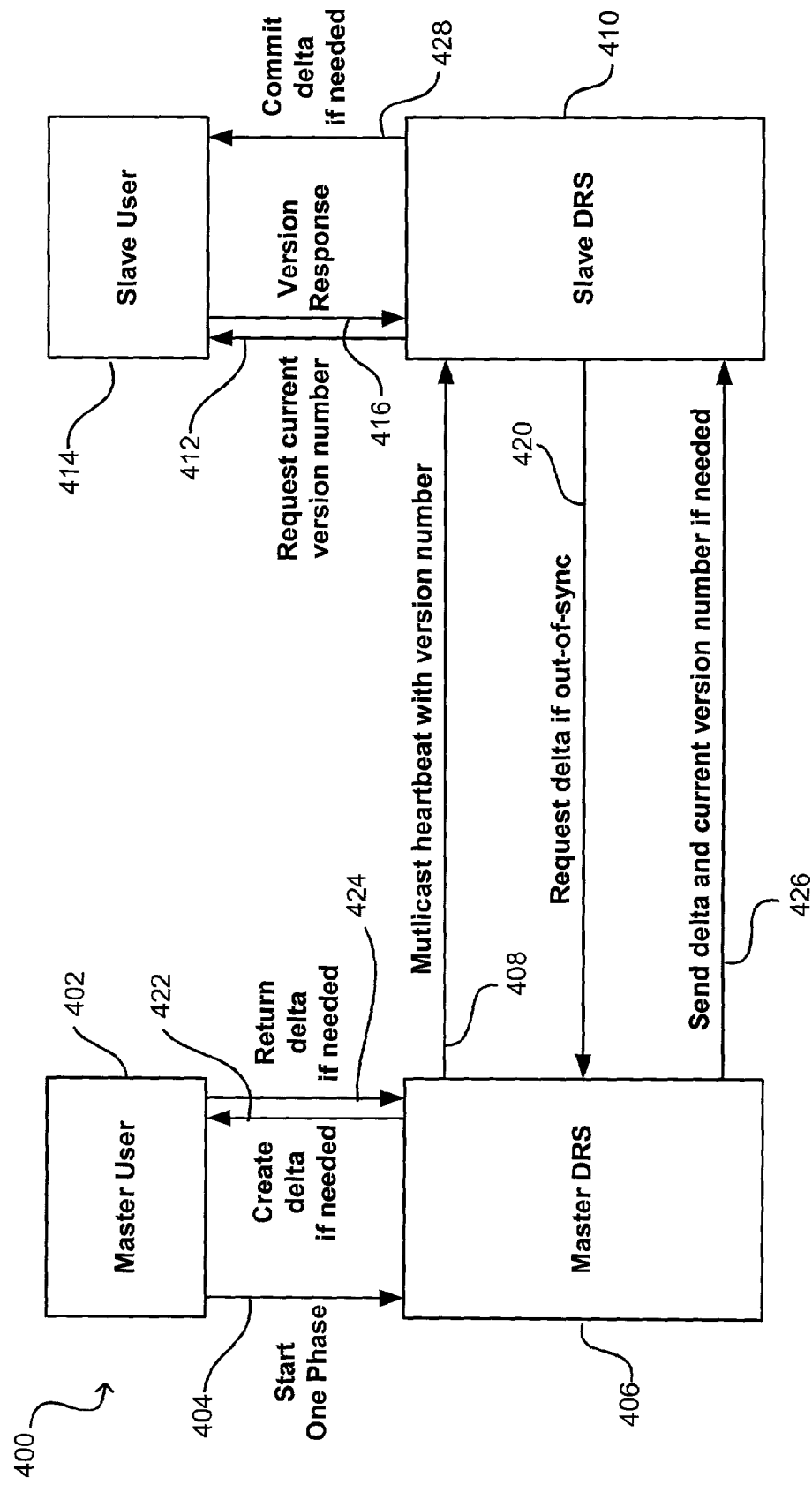
FIG. 4 is a diagram of one phase process for a layered architecture in accordance with one embodiment of the present invention.

FIG. 4 shows one basic process 400 that may be used for a one-phase distribution approach in a layered architecture in accordance with the present invention. In this process, the master user layer 402 makes a downcall 404 into the master DRS layer 406 to start a one phase distribution. This call can be to all slaves in the system, or only to a subset of slave servers. If the call is to a subset, the master user layer 402 can determine the scope of the update, or which slaves should receive the update.

The master DRS layer begins multicasting heartbeats 408, containing the current version number of the data on the master, to the slave DRS layer 410. The slave DRS layer 410 requests the current version number 412 for the slave from the slave user layer 414. The slave user layer 414 then responds 416 to the slave DRS layer 416 with the slave version number. If the slave is in sync, or already is on the current version number, then no further requests may be made until the next update. If the slave is out-of-sync and the slave is in the scope of the update, the slave DRS layer 410 can request a delta 420 from the master DRS layer 406 in order to update the slave to the current version number of the data on the master. The master DRS layer 406 requests 422 that the master user layer 402 create a delta to update the slave. The master user layer 402 then sends the delta 424 to the master DRS layer 406, which forwards the delta 426 and the current version number of the master to the slave DRS layer 410, which sends the delta 426 to the slave user to be committed. The current version number is sent with the delta in case the master has updated since the heartbeat 408 was received by the slave.

The master DRS layer 406 can continue to periodically send a multicast heartbeat containing the version number 408 to the slave server(s). This allows any slave that was unavailable, or unable to receive and process a delta, to determine that it is not on the current version of the data and request a delta 420 at a later time, such as when the slave comes back into the system.

Figure 5:
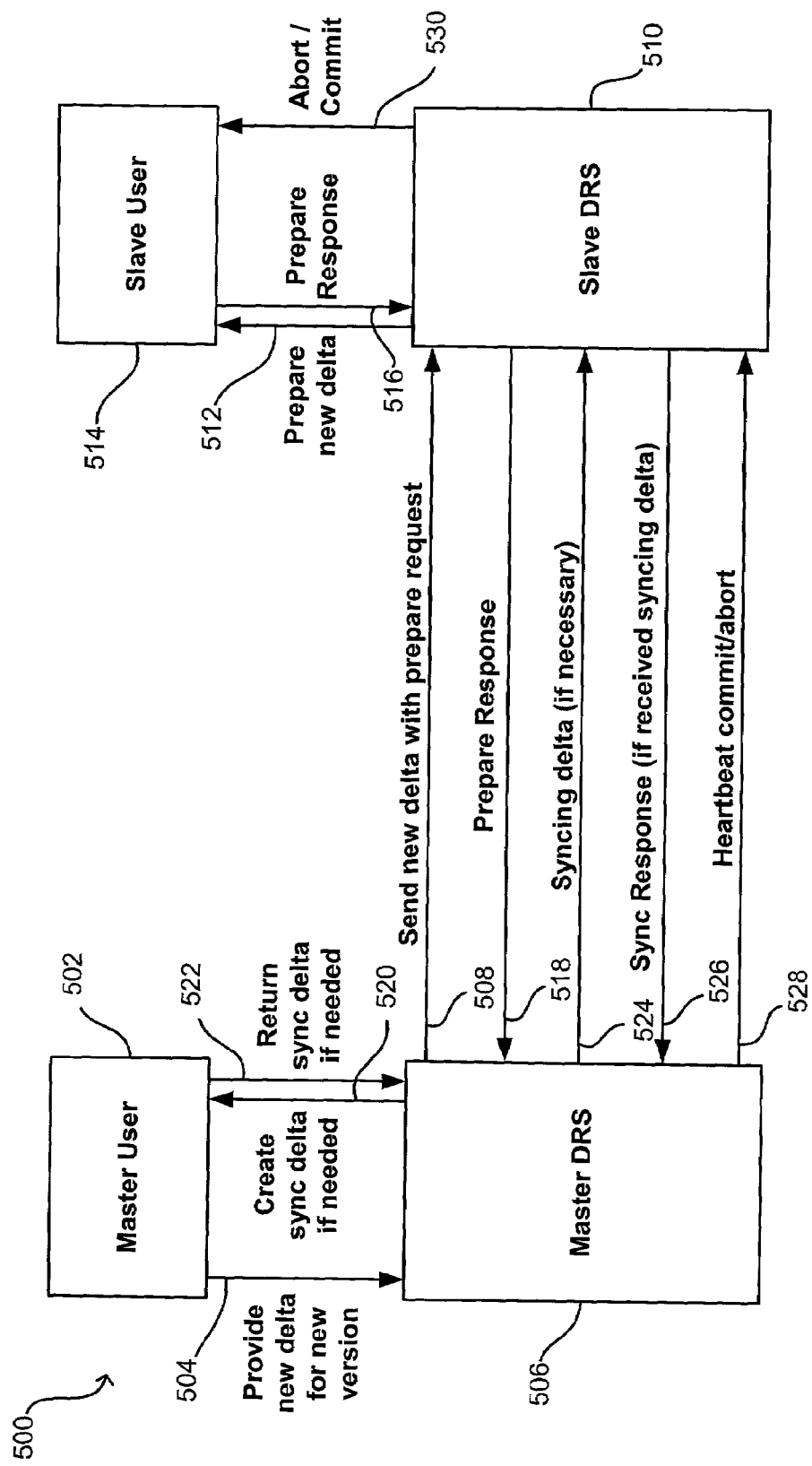
FIG. 5 is a diagram of two phase process for a layered architecture in accordance with one embodiment of the present invention.

FIG. 5 shows one basic process 500 that may be used for a two phase distribution approach in a layered architecture in accordance with the present invention. In this process, the master user layer 504 makes a downcall 504 into the master DRS layer 506 to start a two phase distribution. The master user layer 502 may again need to determine the scope of the update, and may set a "timeout" value for the update process.

The master DRS layer 506 sends the new delta 508 to the slave DRS layer 510. The slave DRS layer 510 sends a prepare request 512 to the slave user layer 514 for the new delta. The slave user layer 514 then responds 516 to the slave DRS layer 510 whether or not the slave can process the new delta. The slave DRS layer forwards the response 518 to the master DRS layer 506. If the slave cannot process the request because it is out-of-sync, the master DRS layer 506 makes an upcall 520 to the master user layer 502 to create a delta that will bring the slave in sync to commit the delta. The master user layer 502 sends the syncing delta 522 to the master DRS layer, which forwards the syncing delta 524 to the slave DRS layer 510. If the slave is able to process the syncing delta, the slave DRS layer 510 will send a sync response 526 to the master DRS layer 506 that the slave can now process the new delta. If the slave is not able to process the syncing delta, the slave DRS layer 510 will send the appropriate sync response 526 to the master DRS layer 506. The master DRS layer 506 then heartbeats a commit or abort message 528 to the slave DRS layer 510, depending on whether or not the slave responded that it was able to process the new delta. If all slave were able to prepare the delta, for example, the master can heartbeat a commit signal. Otherwise, the master can heartbeat an abort signal. The heartbeats also contains the scope of the update, such that a slave knows whether or not it should process the information contained in the heartbeat.

The slave DRS layer forwards this command 530 to the slave user layer 514, which then commits or aborts the update for the new delta. If the prepare phase was not completed within a timeout value set by the master user layer 502, the master DRS layer 506 can automatically heartbeat an abort 528 to all the slaves. This may occur, for example, when the master DRS layer 506 is unable to contact at least one of the slaves to determine whether that slave is able to process the commit. The timeout value can be set such that the master DRS layer 506 will try to contact the slave for a specified period of time before aborting the update.

Figure 6:
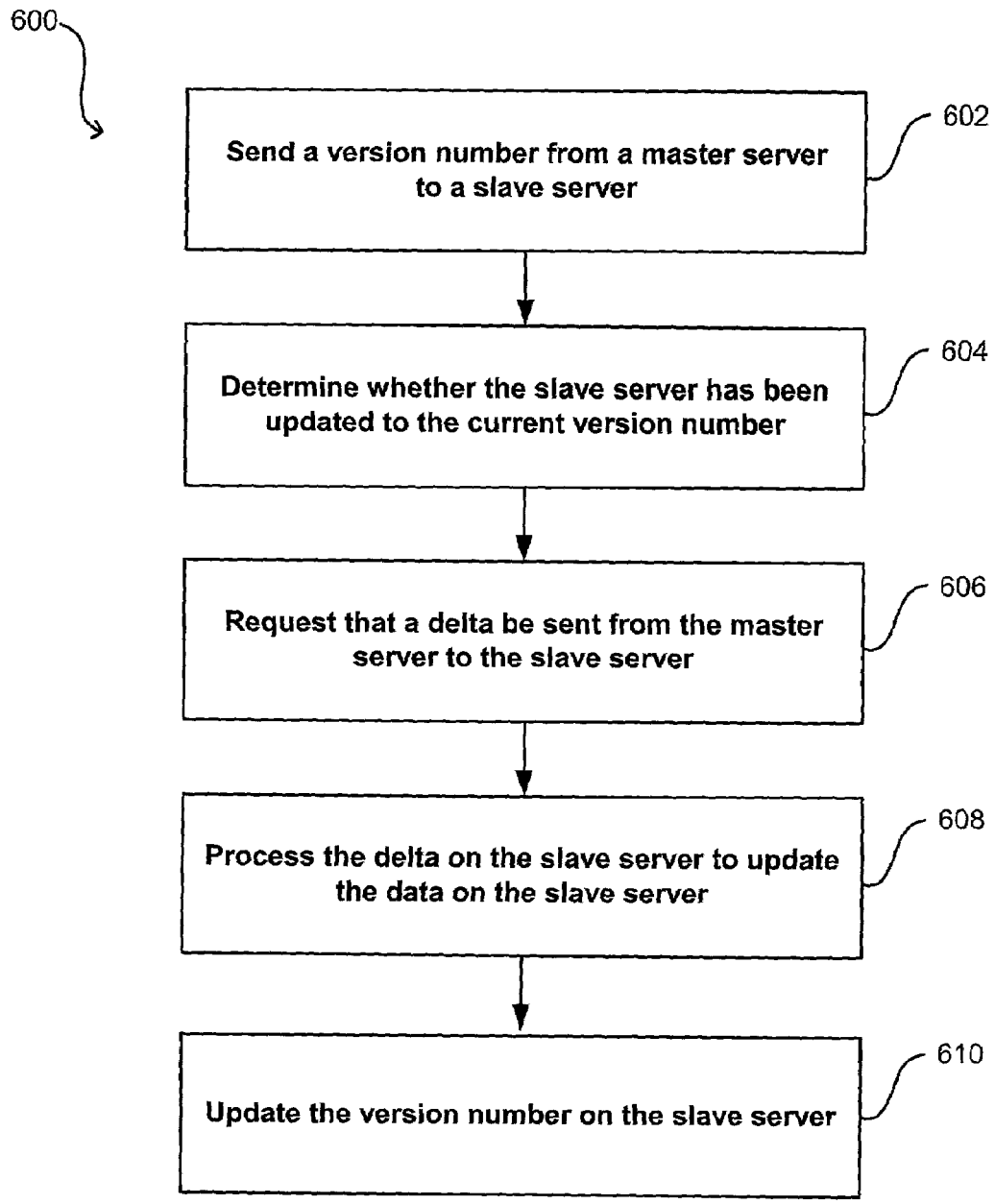
FIG. 6 is a flowchart for a one phase process in accordance with one embodiment of the present invention.

For an update in a one-phase method, these heartbeats can cause each slave to request a delta starting from the slave's current version of the data. Such a process is shown in the flowchart of FIG. 6. In this basic process 600, which may or may not utilize a layered architecture in accordance with the present invention, a version number for the current data on the master server is sent from a master server to a slave server 602. The slave server determines whether it has been updated to the current version number 604. If the slave is not on the current version, it will request that a delta be sent from the master server to update the slave server 606. When the delta is sent to the slave server, the slave server will process the delta in order to update the slave data to the current version 608. The slave server will then update its version number to the current version number 610.

Figure 7:
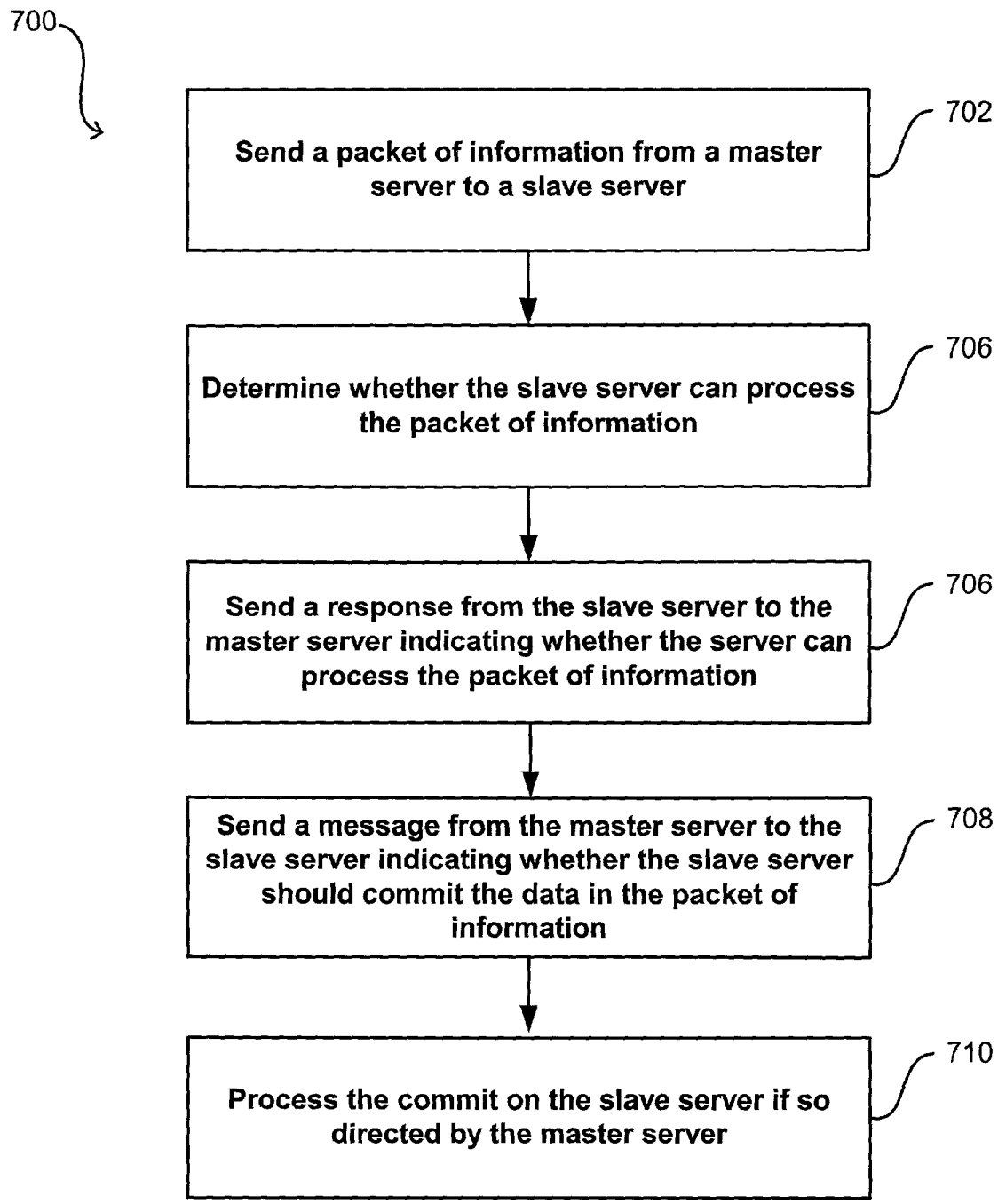
FIG. 7 is a flowchart for a two phase process in accordance with one embodiment of the present invention.

For an update in a two-phase method, the master can begin with a prepare phase in which it pro-actively sends each slave a delta from the immediately-previous version. Such a process is shown in the flowchart of FIG. 7. In this basic process 700, which may or may not utilize a layered architecture in accordance with the present invention, a packet of information is sent from the master to a slave server or slave servers 702. Each slave server receiving the packet determines whether it can process that packet and update to the current version 704. Each slave server receiving the packet responds to the master server, indicating whether the slave server can process the packet 706. If all slaves (to which the delta is sent) acknowledge successful processing of the delta within some timeout period, the master may decide to commit the update. Otherwise, the master server may decide to abort the update. Once this decision is made, the master server sends a message to the slave server(s) indicating whether the update should be committed or aborted 708. If the decision is to commit, each server processes the commit 710. Heartbeats may further be used to signal whether a commit or abort occurred, in case the command was missed by one of the slaves.

A slave can be configured to immediately start and/or restart using cached data, without first getting the current version number from the master. As mentioned above, one protocol in accordance with the present invention allows slaves to persistently cache data on local disks. This caching decreases the time needed for system startup, and improves scalability by reducing the amount of data needing to be transferred. The protocol can improve reliability by allowing slaves to startup and/or restart if the master is unreachable, and may further allow updates to be packaged as incremental deltas between versions. If no cache data exists, the slave can wait for the master or can pull the data itself. If the slave has the cache, it may still not want to start out of sync. Startup time may be decreased if the slave knows to wait.

The protocol can be bilateral, in that a master or slave can take the initiative to transfer data, depending upon the circumstances. For example, a slave can pull a delta from the master during domain startup. When the slave determines it is on a different version than the delta is intended to update, the slave can request a delta from its current version to the current system version. A slave can also pull a delta during one-phase distribution. Here, the system can read the heartbeat, determine that it has missed the update, and request the appropriate delta.

A slave can also pull a delta when needed to recover from exceptional circumstances. Exceptional circumstances can exist, for example, when components of the system are out of sync. When a slave pulls a delta, the delta can be between arbitrary versions of the data. In other words, the delta can be between the current version of the slave and the current version of the system (or domain), no matter how many iterations apart those versions might be. In this embodiment, the availability of a heartbeat and the ability to receive deltas can provide synchronization of the system.

In addition to the ability of a slave to pull a delta, a master can have the ability to push a delta to a slave during two-phase distribution. In one embodiment, these deltas are always between successive versions of the data. This two-phase distribution method can minimize the likelihood of inconsistencies between participants. Slave users can process a prepare as far as possible without exposing the update to clients or making the update impossible to roll back. This can include such tasks as checking the servers for conflicts. If any of the slaves signals an error, such as by sending a "disk full" or "inconsistent configuration" message, the update can be uniformly rolled back.

It is still possible, however, that inconsistencies may arise. For instance, there may be errors in processing a commit, for reasons such as an inability to open a socket. Servers can also commit and expose the update at different times. Because the data cannot reach every managed server at exactly the same time, there can be some rippling effect. The use of multicasting can provide for a small time window, in an attempt to minimize the rippling effect. In one embodiment, a prepared slave will abort if it misses a commit, whether it missed the signal, the master crashed, etc.

A best-effort approach to multicasting can cause a slave server to miss a commit signal. If a master crashes part way through the commit phase, there may be no logging or means for recovery. There may be no way for the master to tell the remaining slaves that they need to commit. Upon abort some slaves may end up committing the data if the version is not properly rolled back. In one embodiment, the remaining slaves could get the update using one-phase distribution. This might happen, for example, when a managed server pulls a delta in response to a heartbeat received from an Admin server. This approach may maintain system scalability, which might be lost if the system tied down distribution in order to avoid any commit or version errors.

Each data item managed by the system can be structured to have a unique, long-lived domain identifier (DID) that is well-known across the domain. A data item can be a large, complex object made up of many components, each relevant to some subset of the servers in the domain. Because these objects can be the units of consistency, it may be desirable to have a few large objects, rather than several tiny objects. As an example, a single data item or object can represent all configuration information for a system, including code files such as a config.xml file or an application-EAR file. A given component in the data item can, for example, be relevant to an individual server as to the number of threads, can be relevant to a cluster as to the deployed services, or can be relevant to the entire domain regarding security certificates. A delta between two versions can consist of new values for some or all of these components. For example, the components may include all enterprise Java beans deployed on members of the domain. A delta may include changes to only a subset of these Java beans.

The "scope" of a delta can refer to the set of all servers with a relevant component in the delta. An Admin server in accordance with the present invention may be able to interpret a configuration change in order to determine the scope of the delta. The DRS system on the master may need to know the scope in order to send the data to the appropriate slaves. It might be a waste of time and resources to send every configuration update to every server, when a master may only need to only touch a subset of servers in each update.

To control distribution, the master user can provide the scope of each update along with the delta between successive versions. A scope may be represented as a set of names, referring to servers and/or clusters, which may be taken from the same namespace within a domain. In one embodiment, the DRS uses a resolver module to map names to addresses. A cluster name can map to the set of addresses of all servers in that cluster. These addresses can be relative, such as to a virtual machine. The resolver can determine whether there is an intervening firewall, and return either an "inside" or "outside" address, relating to whether the server is "inside the firewall" as is known and used in the art. An Admin server or other server can initialize the corresponding resolver with configuration data.

Along with the unique, long-lived domain identifier (DID) for each managed data item, each version of a data item can also have a long-lived version number. Each version number can be unique to an update attempt, such that a server will not improperly update or fail to update due to confusion as to the proper version. Similarly, the version number for an aborted two-phase distribution may not be re-used. The master may be able to produce a delta between two arbitrary versions given just the version numbers. If the master cannot produce such a delta, a complete copy of the data or application may be provided.

It may be desirable to keep the data replication service as generic as possible. A few assumptions may therefore be imposed upon the users of the system. The system may rely on, for example, three primary assumptions:

- the system may include a way to increment a version number
- the system may persistently store the version number on the master as well as the slave
- the system may include a way to compare version numbers and determine equality These assumptions may be provided by a user-level implementation of a DRS interface, such as an interface "VersionNumber." Such an interface may allow a user to provide a specific notion and implementation of the version number abstraction, while ensuring that the system has access to the version number attributes. In Java, for example, a VersionNumber interface may be implemented as follows:

```
package weblogic.drs;
public interface VersionNumber extends Serializable {
    VersionNumber increment( );
    void persist( ) throws Exception;
    boolean equals(VersionNumber anotherVN);
    boolean strictlyGreaterThan(VersionNumber anotherVN);
}
```

A simplistic implementation of this abstraction that a user could provide to the system would be a large, positive integer. The implementation may also ensure that the system can transmit delta information via the network from the master to the slaves, referred to in the art as being "serializable."

If using the abstraction above, it may be useful to abstract from a notion of the detailed content of a delta at the user level. The system may require no knowledge of the delta information structure, and in fact may not even be able to determine the structure. The implementation of the delta can also be serializable, ensuring that the system can transmit delta version information via the network from the master to the slaves.

It may be desirable to have the master persistently store the copy of record for each data item, along with the appropriate DID and version number. Before beginning a two-phase distribution, the master can persistently store the proposed new version number to ensure that it is not reused, in the event the master fails. A slave can persistently store the latest copy of each relevant data item along with its DID and version number. The slave can also be configured to do the necessary caching, such that the slave may have to get the data or protocol every time. This may not be desirable in all cases, but may be allowed in order to handle certain situations that may arise.

A system in accordance with the present invention may further include concurrence restrictions. For instance, certain operations may not be permitted during a two-phase distribution of an update for a given DID over a given scope. Such operations may include a one- or two-phase update, such as a modification of the membership of the scope on the same DID, over a scope with a non-empty intersection.

In at least one embodiment, the master DRS regularly multicasts heartbeats, or packets of information, to the slave DRS on each server in the domain. For each DID, a heartbeat may contain a window of information about the most recent update(s), including each update version number, the scope of the delta with respect to the previous version, and whether the update was committed or aborted. Information about the current version may always be included. Information about older versions can also be used to minimize the amount of traffic back to the master, and not for correctness or liveness.

With the inclusion of older version information in a delta, the slave can commit that portion of the update it was expecting upon the prepare, and ask for a new delta to handle more recent updates. Information about a given version can be included for at least some fixed, configurable number of heartbeats, although rapid-fire updates may cause the window to increase to an unacceptable size. In another embodiment, information about an older version can be discarded once a master determines that all slaves have received the update.

Multicast heartbeats may have several properties to be taken into consideration. These heartbeats can be asynchronous or "one-way". As a result, by the time a slave responds to a heartbeat, the master may have advanced to a new state. Further, not all slaves may respond at exactly the same time. As such, a master can assume that a slave has no knowledge of its state, and can include that which the delta is intended to update. These heartbeats can also be unreliable, as a slave may miss arbitrary sequences of heartbeats. This can again lead to the inclusion of older version information in the heartbeats. In one embodiment, heartbeats are received by a slave in the order they were sent. For example, a slave may not commit version seven until it has committed version six. The server may wait until it receives six, or it may simply throw out six and commit seven. This ordering may eliminate the possibility for confusion that might be created by versions going backwards.

Figure 3:
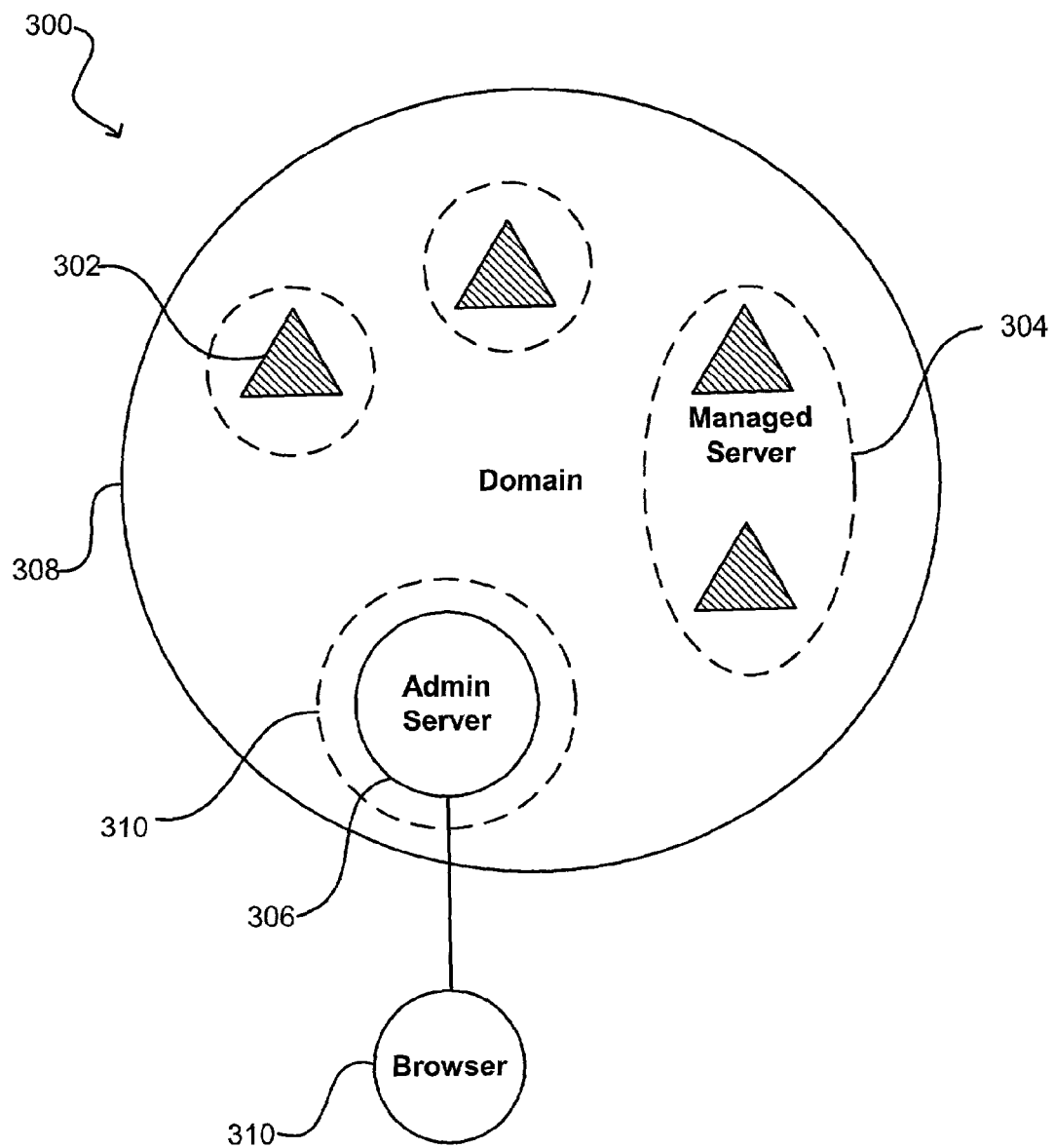
FIG. 3 is a diagram of a clustered domain structure in accordance with one embodiment of the present invention.

As mentioned above, the domains may also utilize clustering, as shown in FIG. 3 (Properties of Multicast Heartbeats slide). The general network topology for this embodiment is a collection of multicast islands, connected to a hub island containing the master. Multicast traffic may be forwarded point-to-point outward from the hub. Small deltas that may be distributed in the one-phase method may be directly transmitted over multicast. In all other cases, deltas may be transmitted over point-to-point links. A tree-structured, point-to-point forwarding scheme may be overlaid on the hub-and-spoke multicast structure to reduce the bottleneck at the master.

In the domain diagram 300 of FIG. 3, one or more of the managed servers 302 can be grouped into a multicast island, also referred to as a cluster 304. An Admin server 306 for the domain 308 acts as the master of the hub island 312, and is the entry point to the domain, such as through a browser 310. The Admin server 306 contacts one of the managed servers in the cluster, referred to as the cluster master. The Admin server in this embodiment can multicast a delta or message to each cluster master, with each cluster master then forwarding that delta or message by multicast to the other managed servers in that cluster. The cluster masters may not own any configuration information, instead receiving the information from the Admin server. In the event that a cluster master goes offline or crashes, another managed server in the domain may take over as cluster master. In this event, a mechanism may be put in place to prevent the offline server from coming back into the cluster as a second cluster master. This may be handled by the cluster or system infrastructure.

There can also be more than one domain. In this case, there can be nested domains or "syndicates." Information can be spread to the domain masters by touching each domain master directly, as each domain master can have the ability to push information to the other domain masters. It may, however, be undesirable to multicast to domain masters.

In one-phase distribution, a master user can make a downcall in order to trigger the distribution of an update. Such a downcall can take the form of:

startOnePhase(DID, newVerNum, scope)

where DID is the ID of the data item or object that was updated, newVerNum is the new version number of the object, and scope is the scope to which the update applies. The master DRS may respond by advancing to the new version number, writing the new number to disk, and including the information in subsequent heartbeats.

When a slave DRS receives a heartbeat, it can determine whether it needs a pull by analyzing the window of information relating to recent updates of interest. If the slave's current version number is within the window and the slave is not in the scope of any of the subsequent committed updates, it can simply advance to the latest version number without pulling any data. This process can include the trivial case where the slave is up-to-date. Otherwise, the slave DRS may make a point-to-point call for a delta from the master DRS, or another similar request, which may take the form of:

createDelta(DID, curVerNum)

where curVerNum is the current number of the slave, which will be sent back to the domain master or cluster master. To handle this request, the master DRS may make an upcall, such as createDelta(curVerNum). This upcall may be made through the appropriate listener in order to obtain the delta and the new version number, and return them to the slave DRS. The new version number should be included, as it may have changed since the slave last received the heartbeat. The delta may only be up to the most recently committed update. Any ongoing two-phase updates may be handled through a separate mechanism. The slave DRS may then make an upcall to the slave user, such as commitOnePhase(newVerNum, delta) and then advance to the new version number.

In order to trigger a two-phase update distribution, the master user can make a downcall, such as startTwoPhase (DID, oldVerNum, newVerNum, delta, scope, timeout), where DID is the ID of the data item or object to be updated, oldVerNum is the previous version number, newVerNum is the new version number (one step from the previous version number), delta is the delta between the successive versions to be pushed, scope is the scope of the update, and timeout is the maximum time-to-live for the job. Because the "prepare" and "commit" are synchronous, it may be desirable to set a specific time limit for the job. The previous version number may be included to that a server on a different version number will not take the delta.

The master DRS in one embodiment goes through all servers in the scope and makes a point-to-point call to each slave DRS, such as prepareTwoPhase(DID, oldVerNum, newVerNum, delta, timeout). The slave can then get the appropriate timeout value. Point-to-point protocol can be used where the delta is large, such as a delta that includes binary code. Smaller updates, which may for example include only minor configuration changes such as modifications of cache size, can be done using the one-phase method. This approach can be used because it may be more important that big changes like application additions get to the servers in a consistent fashion. The master can alternatively go to cluster masters, if they exist, and have the cluster masters make the call. Having the master proxy to the cluster masters can improve system scalability.

In one embodiment, each call to a slave or cluster master produces one of four responses, such as "Unreachable", "OutOfSync", "Nak", and "Ack", which are handled by the master DRS. If the response is "Unreachable", the server in question cannot be reached and may be queued for retry. If the response is "OutOfSync", the server may be queued for retry. In the meantime, the server will attempt to sync itself by using a pull from the master, so that it may receive the delta upon retry. If the response is "NoAck", or no acknowledgment, the job is aborted. This response may be given when the server cannot accept the job. If the response is "Ack", no action is taken.

In order to prepare the slaves, a master DRS can call a method such as prepareTwoPhase. Upon receiving a "prepare" request from the master DRS, the slave DRS can first check whether its current version number equals the old version number to be updated. If not, the slave can return an "OutOfSync" response. The slave can then pull a delta from the master DRS as if it had just received a heartbeat. Eventually, the master DRS can retry the prepareTwoPhase. This approach may be more simple than having the master push the delta, but may require careful configuration of the master. The configuring of the master may be needed, as waiting too long for a response can cause the job to timeout. Further, not waiting long enough can lead to additional requests getting an "OutOfSync" response. It may be preferable to trigger the retry upon completion of the pull request from the slave.

If the slave is in sync, the slave can make an upcall to the client layer on the slave side, as deep into the server as possible, such as prepareTwoPhase(newVerNum, delta). The resulting "Ack" or "Nak" that is returned can then be sent to the master DRS. If the response was an "Ack", the slave can go into a special prepared state. If the response was a "Nak", the slave can flush any record of the update. If it were to be later committed for some reason, the slave can obtain it as a one-phase distribution, which may then fail.

If the master DRS manages to collect an "Ack" from every server within the timeout period, it can make a commit upcall, such as twoPhaseSucceeded(newVerNum), and advance to the new version number. If the master DRS receives a "Nak" from any server, or if the timeout period expires, the master DRS can make an abort upcall, such as twoPhaseFailed (newVerNum, reason), and leave the version number unchanged. Here, reason is an exception, containing a roll-up of any "Nak" responses. In both cases, the abort/commit information can be included in subsequent heartbeats.

At any time, the master DRS can make a cancel downcall, such as cancelTwoPhase(newVerNum). The master DRS can then handle this call by throwing an exception, if the job is not in progress, or acting as if an abort is to occur.

If a prepared slave DRS gets a heartbeat indicating the new version was committed, the slave DRS can make an upcall, such as commitTwoPhase(newVerNum), and advance to the new version number. If a prepared slave DRS instead gets a heartbeat indicating the new version was aborted, the slave can abort the job. The slave can also abort the job when the slave gets a heartbeat where the window has advanced beyond the new version, the slave gets a new prepareTwoPhase call on the same data item, or the slave times out the job. In such a case, the slave can make an upcall, such as abortTwoPhase (newVerNum), and leave the version number unchanged. This is one way to ensure the proper handling of situations such as where a master server fails after the slaves were prepared but before the slaves commit.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for replicating data over a network, the method comprising the steps of:
   (a) before the replication is to be done, determining whether the replication should be accomplished in a one or two phase method based on setup information;
   (b) if the replication is determined to be accomplished in a one phase method, sending replication information determined to be accomplished in a one phase method by:
      sending a packet of information from the master server to the slave server, the information relating to a change in data stored on the master server and containing a version number for a present state of the data;
      thereafter, receiving the packet of information to a slave server;
      thereafter, allowing the slave server to determine whether the data on the slave server has been updated to correspond to the version number; and
      thereafter, requesting a delta be sent from the master server to the slave server if the slave server does not correspond to the version number, the delta containing information needed to update the slave server;
   (c) if the replication is determined to be accomplished in a two phase method, sending replication information determined to be accomplished in a two phase method by:
      sending a packet of update information from the master server to the slave server, the information relating to a change in the data stored on the master server and containing a version number for the present state of the data;
      thereafter, allowing the slave server to determine whether the slave server has been updated to correspond to the version number, and to further determine whether the slave server can process the packet of update information;

thereafter, sending a signal from the slave server to the master server indicating whether the slave server needs to be updated and whether the slave server can process the packet of update information;

thereafter, sending a response signal from the master server to the slave server indicating whether the slave server should commit to the packet of update information; and thereafter, committing the packet of update information to the slave server if so indicated by the response signal;

wherein the update information is committed to all the slaves if all the slaves are able to commit the update information and the update information is not committed to any slave, if any slave is not able to commit the update information.

2. The method of claim 1, wherein multiple data items are replicated over the network, each data item having an associated data item identifier; and wherein the version number is associated with one of the data item identifiers.

3. A method for replicating data over a network, the method comprising the steps of:

(a) before the replication is to be done, determining whether replication should be accomplished in a one or two phase method based on setup information;

(b) if the replication is determined to be accomplished in a one phase method, sending data to be replicated in a one phase method by:

sending a version number for a current state of the data from a master server to a slave server;

thereafter, requesting a delta be sent from the master server to the slave server if the data on the slave server does not correspond to the version number; and (c) if the replication is determined to be accomplished in a two phase method, sending data to be replicated in a two phase method by:

sending a packet of update information from the master server to a slave server;

thereafter, determining whether the slave server can process the packet of update information; and thereafter, committing the packet of update information to the slave server if the slave server can process the packet of update information;

wherein the update information is committed to all the slaves if all the slaves are able to commit the update information and the update information is not committed to any slave, if any slave is not able to commit the update information.

4. The method of claim 3, wherein multiple data items are replicated over the network, each data item having an associated data item identifier; and wherein the version number is associated with one of the data item identifiers.

5. A method for replicating data from a master to a plurality of slaves on a network, the method comprising the steps of:

(a) before the replication is to be done, determining whether replication should be accomplished in a one or two phase method based on setup information;

(b) if the replication is determined to be accomplished in a one phase method, sending data to be replicated in a one phase method by:

sending a version number for a current state of the data from the master to each slave; and thereafter, requesting a delta be sent from the master to each slave containing data that does not correspond to the version number;

(c) if the replication is determined to be accomplished in a two phase method, sending data to be replicated in a two phase method by:

sending a packet update of information from the master to each slave; and thereafter, committing the packet of update information to the slaves if each of the plurality of slaves can process the packet of update information;

wherein the update information is committed to all the slaves if all the slaves are able to commit the update information and the update information is not committed to any slave, if any slave is not able to commit the update information.

6. The method of claim 5, wherein multiple data items are replicated over the network, each data item having an associated data item identifier; and wherein the version number is associated with one of the data item identifiers.

* * * * *

UNITED STATES PATENT AND TRADEMARK OFFICE
CERTIFICATE OF CORRECTION

PATENT NO. : 7,571,215 B2  Page 1 of 1
APPLICATION NO. : 09/975590
DATED : August 4, 2009
INVENTOR(S) : Dean Bernard Jacobs et al.

It is certified that error appears in the above-identified patent and that said Letters Patent is hereby corrected as shown below:

Title Page, Item (56), on page 2, in column 2, under "U.S. Patent Documents", line 38, delete "Gunduce et al." and insert -- Gunduc et al. --, therefor.

Title Page, Item (56), on page 2, in column 2, under "Other Publications", line 5, before "Dean Bernard" delete "filed".

Title Page, Item (56), on page 2, in column 2, under "Other Publications", line 7, before "Chang, et al." delete "filed".

Title Page, Item (56), on page 2, in column 2, under "Other Publications", line 14, delete "v.40," and insert -- 2001, v.40, --, therefor.

On sheet 4 of 7, in Figure 4, in Ref. Numeral 408, line 1, delete "Mutlicast" and insert -- Multicast --, therefor.

On sheet 7 of 7, in Figure 7, delete the first occurrence of "706" in flowchart 700 and insert -- 704 --, therefor.

In column 1, line 15, delete "90/975,587" and insert -- 09/975,587 --, therefor.

In column 14, line 27, in claim 5, delete "update of" and insert -- of update --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,571,215 B2  
APPLICATION NO. : 09/975590  
DATED : August 4, 2009  
INVENTOR(S) : Jacobs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Seventh Day of September, 2010

David J. Kappos
*Director of the United States Patent and Trademark Office*